April 27, 1943.   S. MYERSON   2,317,935

MOTOR VEHICLE CONTROL MECHANISM

Filed July 16, 1941

Inventor
Simon Myerson
by Roberts, Cushman & Woodbury
att'ys.

Patented Apr. 27, 1943

2,317,935

UNITED STATES PATENT OFFICE 2,317,935

MOTOR VEHICLE CONTROL MECHANISM

Simon Myerson, Brookline, Mass.

Application July 16, 1941, Serial No. 402,619

3 Claims. (Cl. 192—3)

This invention pertains to motor vehicles, and relates more particularly to improvements in the control mechanism for such vehicles.

Usual types of motor vehicle are provided with a foot pedal for controlling the clutch, a second foot pedal for operating the brake, and a third foot pedal or accelerator for controlling the admission of fuel to the carburetor or intake manifold. These foot pedals are usually so arranged that the clutch pedal is operated by the left foot and the other two pedals, alternatively, are operated by the right foot.

Recent developments in automotive design have eliminated the clutch and its actuating pedal and thus while the operator's right foot must still actuate both the brake and fuel supply pedals, the left foot has nothing to do. When driving in heavy traffic or under city conditions the right foot must be shifted back and forth between the brake and fuel supply pedals at very frequent intervals, and since the brake pedal must necessarily be arranged at a normally high elevation in order to provide the required travel in applying the brake and at the same time must be closely adjacent to the fuel supply pedal, the operator's right foot must be lifted to a substantial elevation in moving from the fuel supply pedal to the brake pedal with resultant fatigue and consequent slowing down of the reaction essential to safe driving. It is also well recognized that the necessity of shifting the right foot from the brake to the fuel supply pedal in accelerating the vehicle is quite difficult for the operator, particularly if he is not experienced, when starting from a full stop with the vehicle headed upgrade.

Among the objects of the present invention are to provide an arrangement of control pedals designed to avoid the above difficulties and in particular to arrange the pedals so that the control is distributed between the right and left foot of the operator, thus relieving fatigue, insuring a quick control, and facilitating starting on an upgrade. A further object is to provide control means such that in the normal operation of the vehicle the braking effect may be obtained by the use of the left foot except for sudden or emergency stops when the right foot or both feet, if desired, may be employed for this purpose. A further object is to provide an arrangement whereby the brake actuating pedal, if it is to be operated by the right foot, may be disposed in a position such that it is more readily accessible for actuation by the foot than is usually the case, thus relieving the operator of the necessity of lifting his foot so high and thereby decreasing fatigue.

Figure 1:
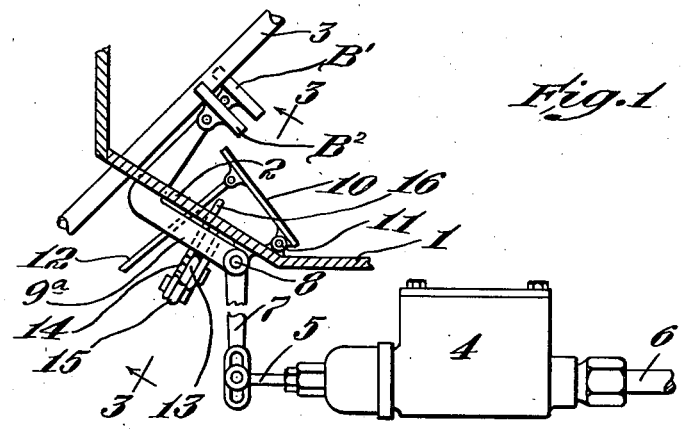
Figure 2:
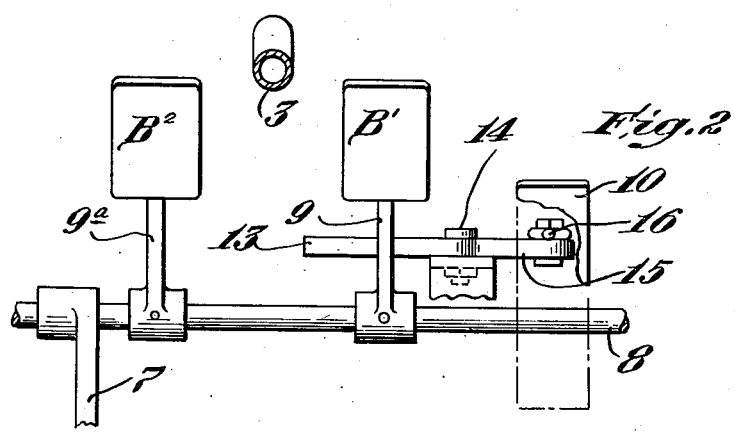
Figure 3:
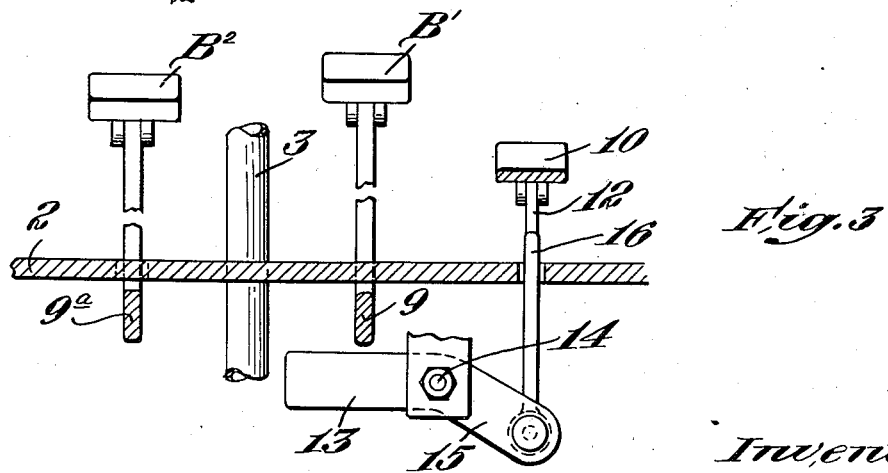

Other and further objects and advantages of the invention will be pointed out in the following more detailed description and by reference to the accompanying drawing, wherein Fig. 1 is a fragmentary diagrammatic vertical section illustrating the footboard of a motor vehicle with the brake and fuel supply pedals relatively disposed in accordance with one embodiment of the present invention;

Fig. 2 is an enlarged plan view, with parts removed, of the arrangement shown in Fig. 1; and Fig. 3 is a section on the line 3—3 of Fig. 1.

Referring to the drawing, the numeral 1 designates the floor of a motor vehicle of conventional type except that it is assumed that the vehicle will be of the kind in which the clutch and clutch-actuating pedals have been eliminated. The numeral 2 designates the footboard, and the numeral 3 the steering post. It is assumed that the vehicle is provided with a hydraulic brake system, although it is not essential that the brakes be actuated hydraulically, but as here illustrated the vehicle is provided with the master hydraulic cylinder 4 provided with a piston which is actuated by the piston rod 5, the master-cylinder being furnished with delivery ducts 6 which lead to the brake cylinders of the individual wheels. The piston rod 5 is actuated by a lever 7 secured to rock-shaft 8 and which is rocked by means of either angle lever 9 or 9a, each of which has a vertical arm extending up through an opening in the floor board 2. The upper end of the angle levers 9 and 9a are provided with brake pedals $B^1$ and $B^2$, respectively. The fuel supply pedal or accelerator 10 is pivoted at 11 on the footboard and is provided with a suitable motion-transmitting rod 12 leading to the connections for operating the fuel admission valve.

As illustrated in Fig. 2, the brake pedal $B^1$ is arranged at the right of the steering post 3 while the fuel supply pedal or accelerator 10 may be arranged for convenient operation, here shown as being at the right of the brake pedal $B^1$. Assuming, as above, that there is no clutch or clutch pedal, the arrangement of brake and fuel supply pedals illustrated in Fig. 2 distributes the work of controlling the car between the right and left feet of the operator. Furthermore, since the right foot is not obliged to shift from the fuel supply pedal to the brake pedal, the latter may be arranged lower than its usual position, that is to say, nearer the floorboard of the vehicle, where it is more convenient for the operator and does not necessitate so high a lift of the knee in placing the foot in operative engagement with the pedal. This distribution of the work and location of the brake pedal tends to reduce fatigue, particularly when the vehicle is being driven under conditions requiring frequent stopping and starting. Moreover, the arrangement whereby one foot controls the fuel supply and the other the brake, makes it much easier to start from a completely stopped position on an upgrade than when one foot is obliged to shift from the brake to the fuel supply pedal in order to accelerate the vehicle and consequently the frequency of use of the hand emergency brake is reduced.

With this arrangement, and assuming that the left-hand pedal $B^2$ is employed for ordinary braking action, depression of this pedal by the left foot simultaneously depresses the pedal $B^1$. Thus, the pedal $B^1$ is automatically moved down to a position where it is near the level of the fuel supply pedal 10 (from a normal elevated position) so that if it becomes necessary to place the right foot on the pedal $B^1$, the latter has already been disposed in a convenient position so that high lift of the right knee is not necessary.

In order to insure reducing the fuel supply and thus slowing down the motor when the brake is applied, one of the angle levers, here shown as lever 9, when depressed, is engageable with one arm 13 of a transverse lever pivoted at 14 to a suitable bracket and having a second arm 15 to which is connected a lifter pin 16. This lifter pin is disposed beneath the forward part of the pedal 10, and when the brake pedal $B^1$ is depressed for applying the brake, the pin 16 is elevated, thus pushing the pedal 10 upwardly (if it is at this time depressed) and so reducing the fuel supply.

While I have shown and described one desirable embodiment of the invention, it is to be understood that this disclosure is for the purpose of illustration and that various changes and modifications may be made without departing from the spirit and scope of the invention as set forth in the appended claims.

I claim:

1. In a motor vehicle of the kind having a power plant, a brake system, a foot pedal for controlling the admission of fuel to the power plant, and a foot pedal for actuating the brake system, a rock-lever having one arm disposed for engagement by the brake-actuating pedal when the latter is depressed, said lever having a second arm and a lifter device connected thereto, said lifter device being constructed and arranged to engage and to lift the fuel supply pedal from depressed position upon depression of the brake-actuating pedal.

2. In a motor vehicle of the kind having a power plant, a brake system, a foot pedal for controlling the supply of fuel to the power plant, a pair of pedals for operating the brake system, one of the brake pedals being arranged for actuation by the right foot of the operator alternatively with the actuation of the fuel supply pedal by the same foot, said brake pedals being secured to a rock-shaft whereby depression of one brake pedal by one foot correspondingly lowers the other brake pedal preparatory to the actuation of the latter by the other foot, and means operated by the first brake pedal to restrict the fuel supply.

3. In a motor vehicle of the kind having a power plant, a brake system, a pair of pedals for operating the brake system, a foot pedal located adjacent to one of the brake pedals for controlling the supply of fuel to the power plant, one of the brake pedals being arranged for actuation by the foot of the operator alternatively with the actuation of the fuel supply pedal, said brake pedals being rigidly secured to a rock-shaft whereby depression of one pedal by one foot correspondingly lowers the other brake pedal preparatory to the actuation of the latter by the other foot, and means carried by said rock-shaft and operative to restrict the fuel supply in response to operation of one of the brake pedals.

SIMON MYERSON.